United States Patent
Kumamoto

(10) Patent No.: US 10,318,219 B1
(45) Date of Patent: Jun. 11, 2019

(54) IMAGE FORMING SYSTEM, IMAGE FORMING APPARATUS, AND IMAGE FORMING METHOD TO PROCESS REFERENCE IMAGE WITH FIXED LOCATION FOR VARIABLE DATA PRINTING

(71) Applicant: KYOCERA Document Solutions Inc., Osaka (JP)

(72) Inventor: Danny N. Kumamoto, Garden Grove, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/898,026

(22) Filed: Feb. 15, 2018

(51) Int. Cl.
G06F 3/12 (2006.01)
G03G 15/00 (2006.01)
G06K 15/02 (2006.01)

(52) U.S. Cl.
CPC ....... *G06F 3/1243* (2013.01); *G03G 15/5016* (2013.01); *G03G 15/5075* (2013.01); *G06F 3/1206* (2013.01); *G06F 3/1256* (2013.01); *G06K 15/1822* (2013.01); *G03G 2215/00109* (2013.01)

(58) Field of Classification Search
CPC ...... G06F 3/1243; G06F 3/1256; G03G 15/36
USPC ................... 358/1.9, 3.27, 1.18, 540
See application file for complete search history.

(56) References Cited

U.S. PATENT DOCUMENTS

2011/0122432 A1* 5/2011 Do .................. H04N 1/203
  358/1.15
2013/0063736 A1* 3/2013 Chiba ................ G06T 11/60
  358/1.6

FOREIGN PATENT DOCUMENTS

JP 2008-023791 A 2/2008

* cited by examiner

*Primary Examiner* — Jamares Q Washington
(74) *Attorney, Agent, or Firm* — Hawaii Patent Services; Nathaniel K. Fedde; Kenton N. Fedde

(57) ABSTRACT

Provided is an image forming system that can generate the data of variable data printing, easily. Image forming system X includes A printing a terminal and an image forming apparatus. The terminal includes a form making part, a layer setting part, and a display part. The form making part generates a form data for variable data printing in which a plurality of objects is arranged. The layer setting part sets overlapped object where the object for a reference is behind as a semi-transparent layer. The display part superimposes the object set as the semi-transparent layer set up by the layer setting part, and corresponding variable data.

20 Claims, 15 Drawing Sheets

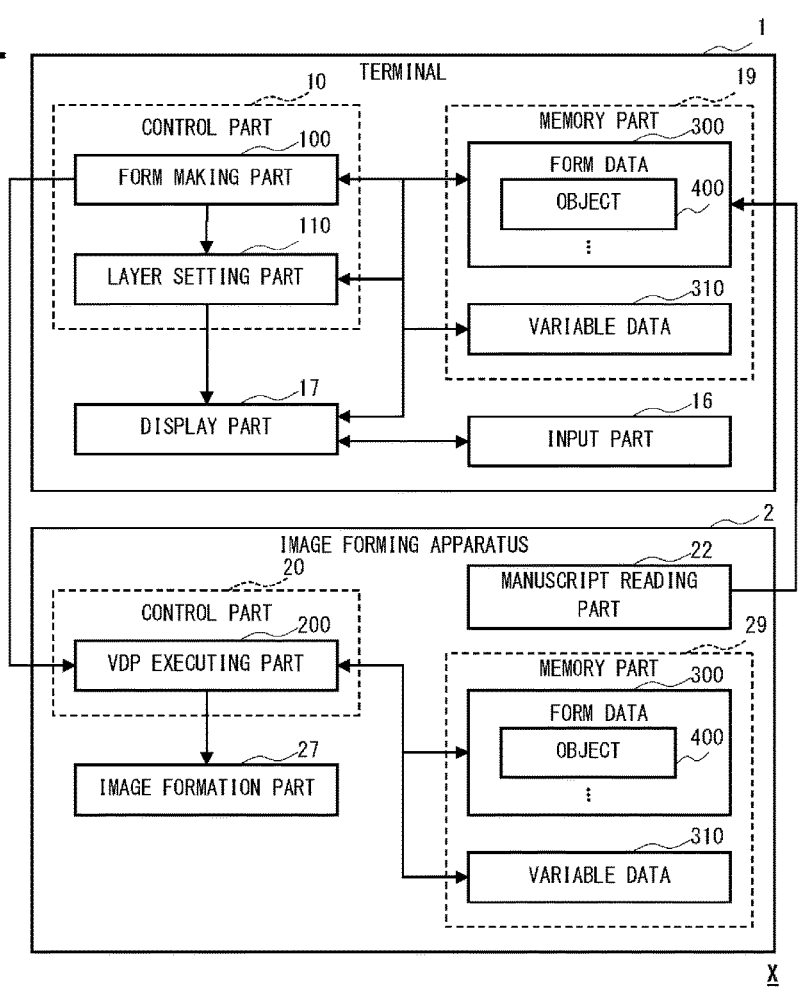

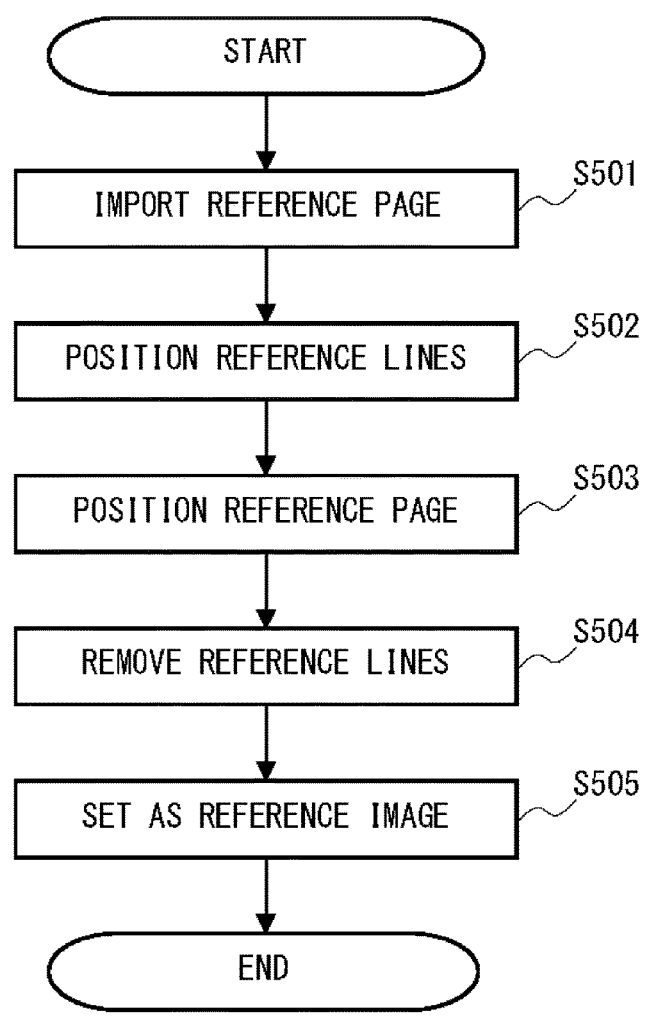

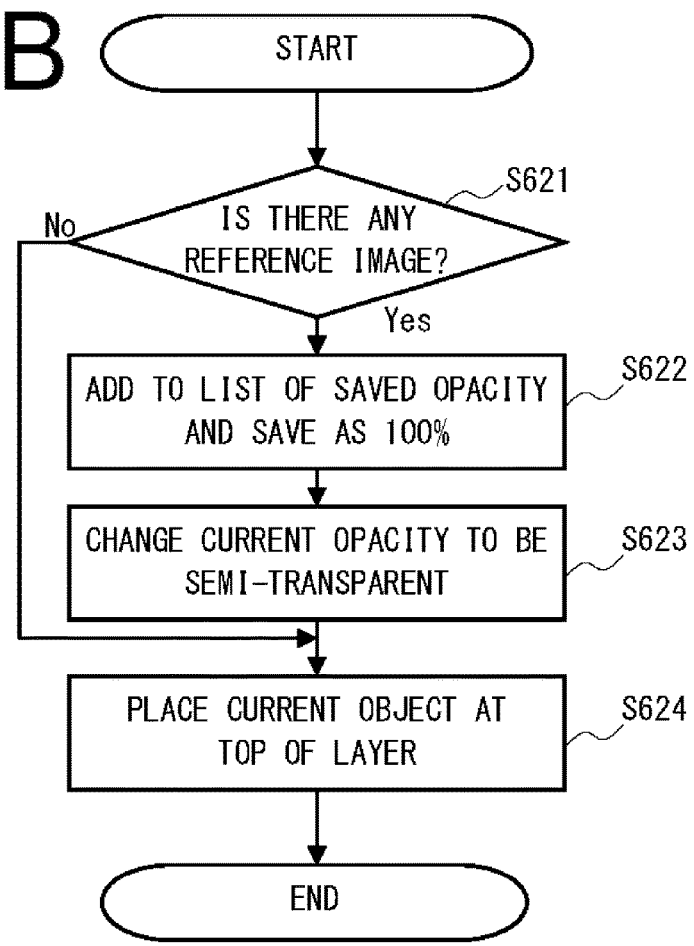

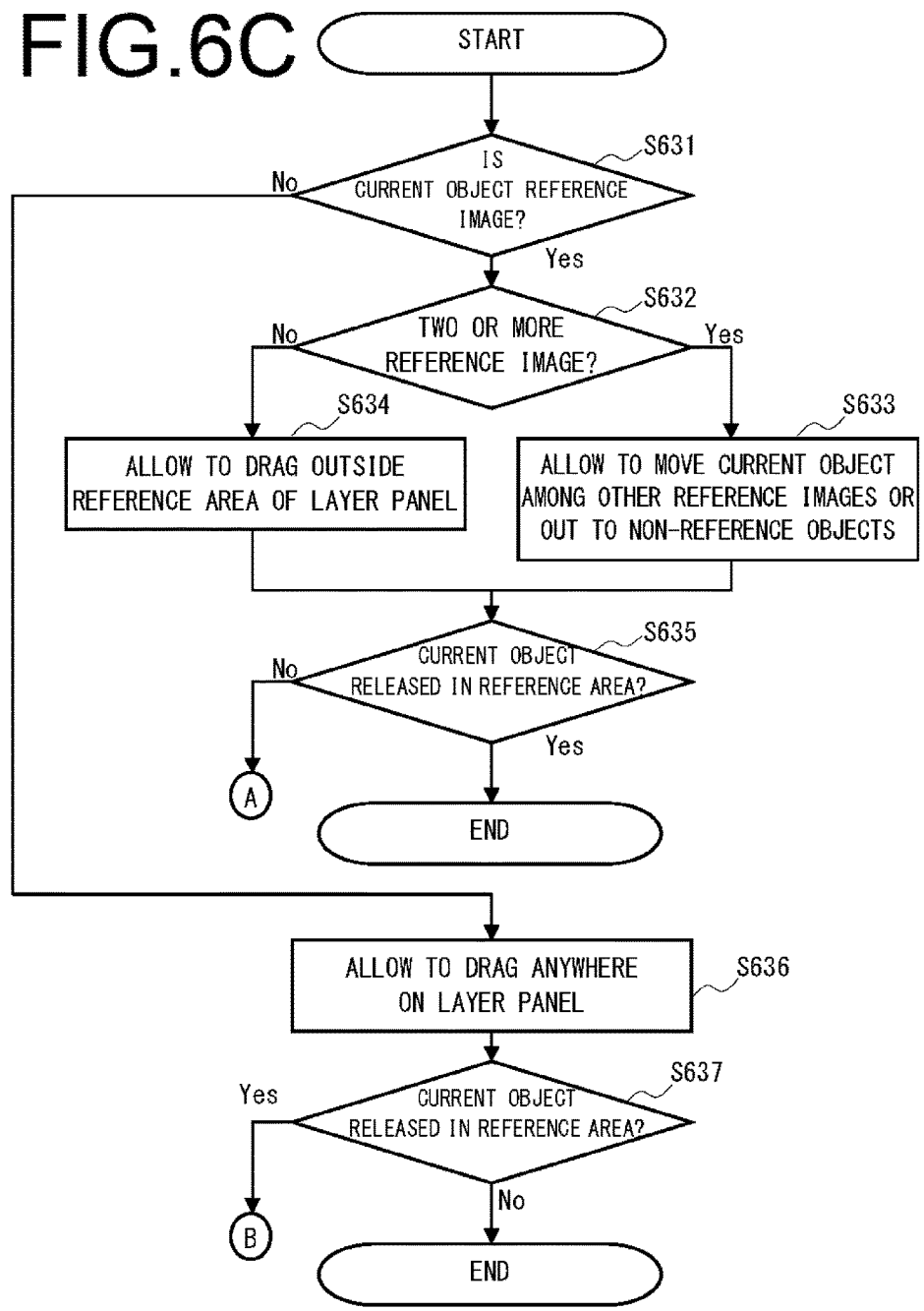

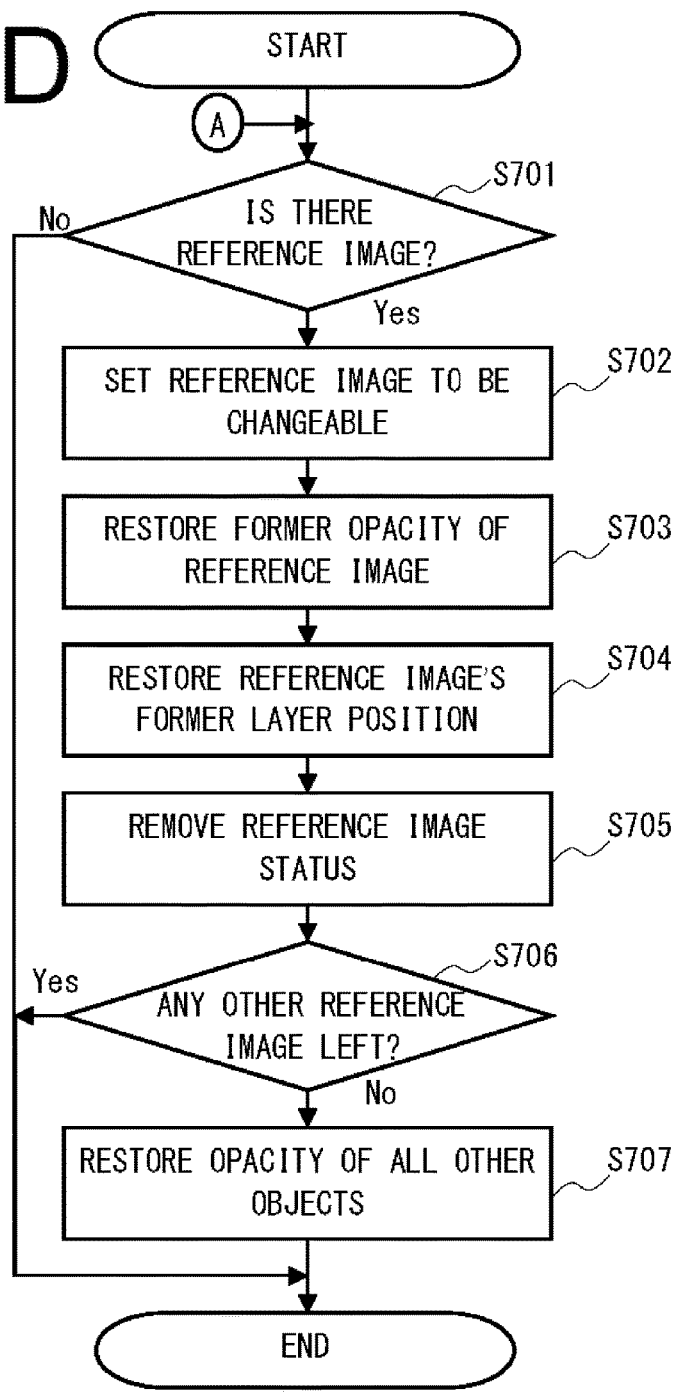

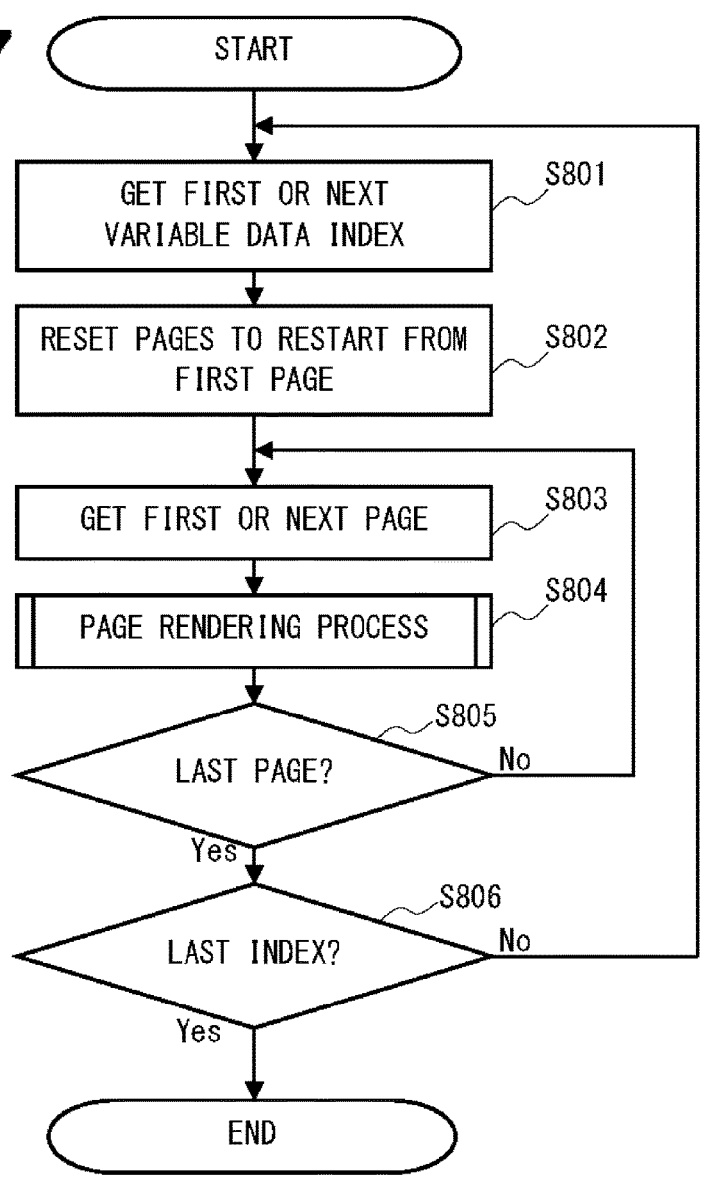

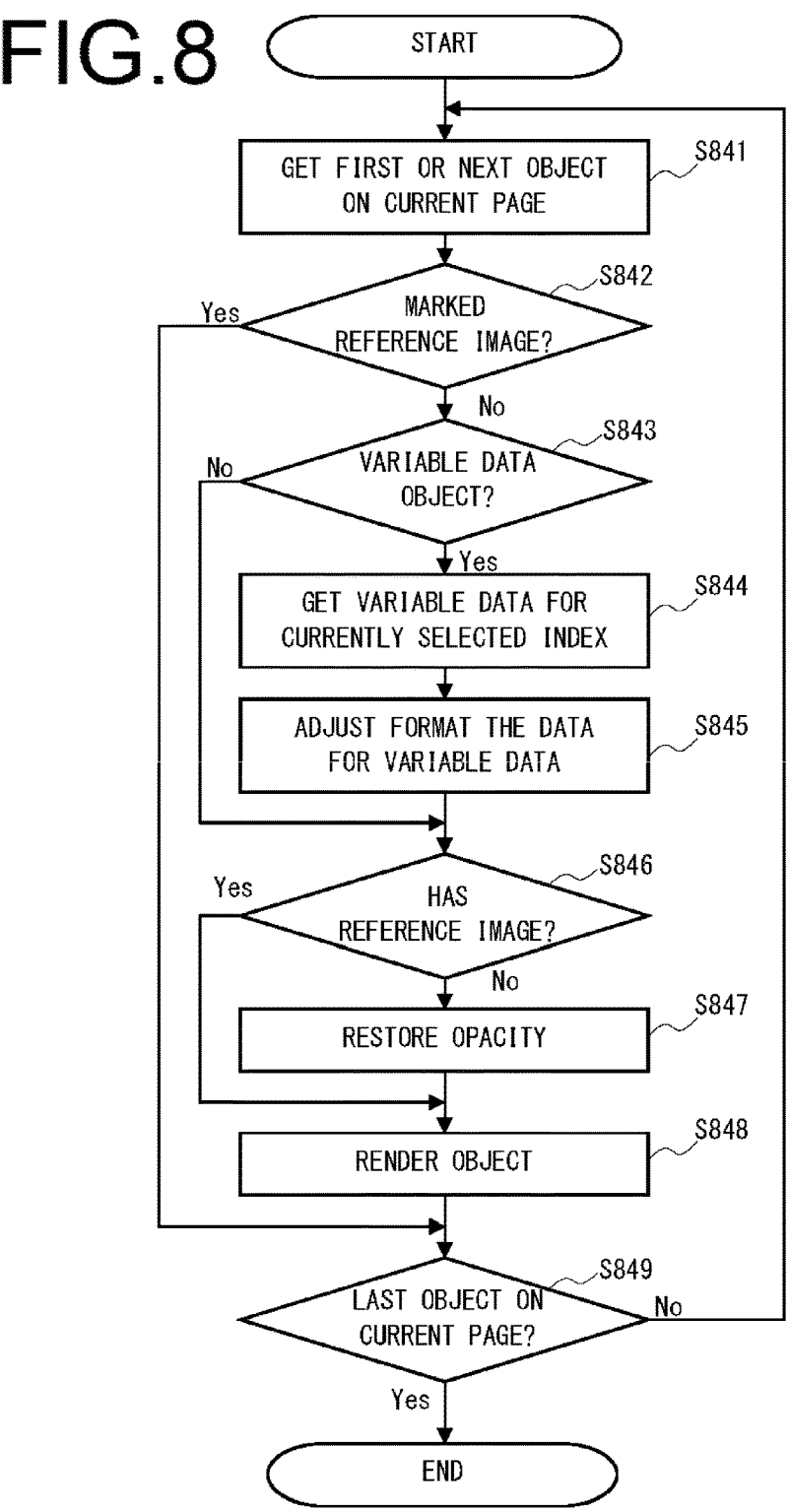

IMAGE FORMING SYSTEM, IMAGE FORMING APPARATUS, AND IMAGE FORMING METHOD TO PROCESS REFERENCE IMAGE WITH FIXED LOCATION FOR VARIABLE DATA PRINTING

BACKGROUND

The present disclosure especially associated with an image forming system, an image forming apparatus, and an image forming method that are used for variable data printing.

An image forming apparatus, such as an MFP (Multifunctional Peripheral,) which can print a document and an image, is present.

Also, some image forming apparatuses have function of variable data printing (VDP.) In variable data printing, it prints by changing the contents to print based on the variable data, such as addresses of direct mail, or the like.

As a typical technology of such variable data printing, an image forming apparatus, an image forming method, and an image formation program, which can grasp the amount of differences between print point of form data and variable data, easily and accurately, without using special tools, such as a ruler, are disclosed. In the technology, an image forming apparatus pile-up prints a "scale" for measuring the amount of differences of a print point mutually with form and variable data.

SUMMARY

An image forming system in the present disclosure is an image forming system including a terminal and an image forming apparatus. The terminal includes a form making part, a layer setting part, and a display part. The form making part generates form data of variable data printing in which a plurality of objects is arranged. The layer setting part sets an object generated by the form making part that overlaps an object for a reference behind as a semi-transparent layer. The display part superimposes the object set as the semi-transparent layer by the layer setting part and a layer of other objects. The image forming apparatus includes an image formation part. The image formation part performs variable data printing with the form data generated in the terminal.

A terminal of the present disclosure includes a form making part, a layer setting part, and a display part. The form making part generates the form data of variable data printing in which a plurality of objects is arranged. The layer setting part sets an object generated by the form making part that overlaps an object for a reference behind as a semi-transparent layer. The display part superimposes the object set as the semi-transparent layer by the layer setting part, and a layer of other objects.

An image forming method of the present disclosure is an image forming method executed by an image forming system including a terminal and an image forming apparatus. Form data of variable data printing in which a plurality of objects is arranged are generated. The generated object that overlaps an object for a reference behind is set as a semi-transparent layer. The object set as the semi-transparent layer and the layer of other objects are superimposed. Variable data printing is performed by using the form data.

BRIEF DESCRIPTION OF THE DRAWINGS

FIG. 4 is a block diagram showing a control configuration of the image forming system according to the embodiment in the present disclosure;

FIG. 5 is a flow chart of reference image setting process according to the embodiment in the present disclosure;

FIG. 6B is a flow chart of new object adding process according to the embodiment in the present disclosure;

FIG. 6C is a flow chart of object moving process according to the embodiment in the present disclosure;

FIG. 6D is a flow chart of removing reference image setting process according to the embodiment in the present disclosure;

FIG. 7 is a flow chart of job rending process according to the embodiment in the present disclosure;

FIG. 8 is a flow chart of page rendering process according to the embodiment in the present disclosure;

DETAILED DESCRIPTION

Embodiment

[System Configuration of Image Forming System X]

Figure 1:
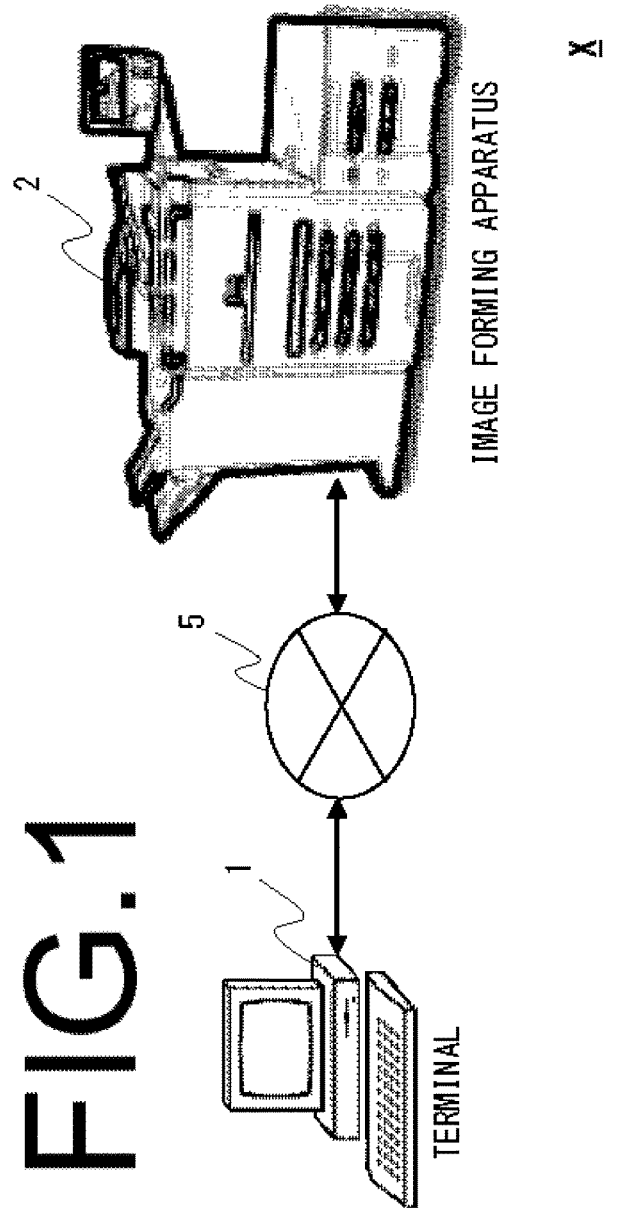
FIG. 1 is a system configuration diagram in the image forming system according to the embodiment in the present disclosure.

Firstly, as refer to FIG. 1 of overall diagram, a configuration of image forming system X is explained. According to FIG. 1, image forming system X according to the embodiment in the present disclosure includes terminal 1 and image forming apparatus 2. Also, each apparatus is connected with connection 5.

Terminal 1 is an information processing apparatus possibly generating, editing, and making data for variable data printing with image forming apparatus 2. For example, terminals 1 may be a PC, a mobile phone, a smart phone, a PDA (Personal Data Assistant,) or the like. Also, terminal 1 may execute a general-purpose OS (Operating System.)

Also, terminal 1 possibly install a device driver and a various application software (hereinafter, it only calls "application") for image forming apparatus 2. Thereby, terminal 1 can make data for variable data printing.

Image forming apparatus 2 is an MFP, a printer, or the like, which variable data printing is possible.

Connection 5 is a network as like LAN (Local Area Network), WAN (Wide Area Network), or the like, in the present embodiment. Also, connection 5 may be a physical or wireless connection between Terminal 1 and Image forming apparatus 2. The physical connection may be USB (Universal Serial Bus,) IEEE1394, or the like. Also, connection 5 may be a wireless connection as like WiFi®, Bluetooth®, infrared connection, Near-field communication (NFC), or the like.

In addition, image forming system X may has a plurality of terminals 1 and image forming apparatuses 2, respectively. On the contrary, a stand-alone configuration, which either terminal 1 or image forming apparatus 2 is not present, is also possible.

Further, image forming system X can be a desktop system, server, mobile device, or any other computing device, is connected to MFP or printer via network, some other physical or wireless connection. Further, terminal itself can be used as the system.

(Configuration of Terminal 1)

Figure 2:
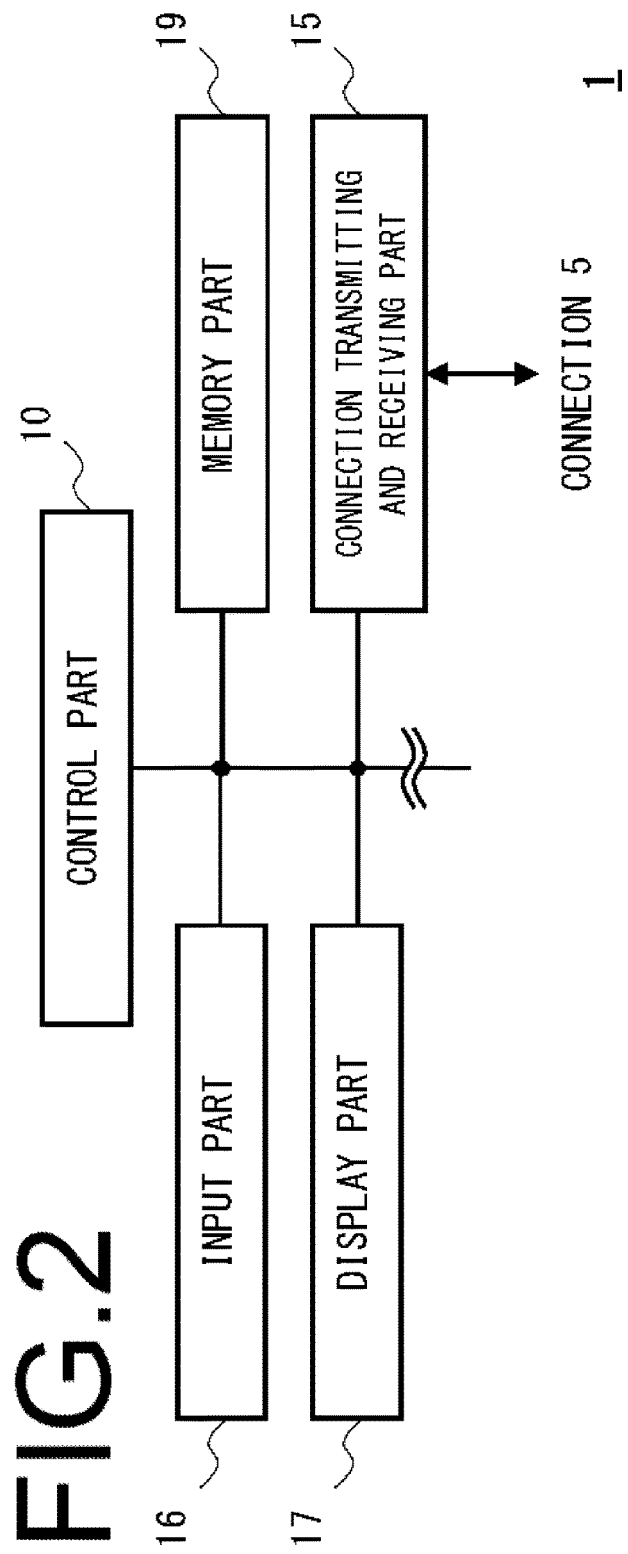
FIG. 2 is a block diagram showing a configuration of the terminal as shown in FIG. 1.

As refer to FIG. 2, terminal 1 includes control part 10, connection transmitting and receiving part 15, input part 16, display part 17, and memory part 19.

Control part 10 is an information processing part, such as CPU (Central Processing Unit,) or the like.

Connection transmitting and receiving part 15 is a connecting part for connecting with connection 5. Connection transmitting and receiving part 15 transmits and receives data via network, wired or wireless connection.

Input part 16 is a keyboard, a pointing device, or the like, for acquiring some various instructions by a user. Input part 16, is possible to input various instructions by a user and to acquire them by using GUI (Graphical User Interface) on OS. Also, by instructions where the user inputs by using input part 16, it is possible to perform to make and transmit the data of variable data printing. It is also possible to perform to input or change each user's information, or the like.

Display part 17 is a type of dot-matrix display. Display part 17 can display a various operation screens (windows) for GUI.

In addition, input part 16 and display part 17 may be integrated as one unit, such as a touch panel display, or the like.

Memory part 19 is a memory by using a non-transitory recording medium. Also, in the auxiliary memory part of memory part 19, a control program for operation-controlling terminal 1 is stored. The control program includes the programs and data of firmware, OS, various applications, or the like. Also, the control program may include a middleware worked on OS, a device driver, or the like. In addition, memory part 19 may also store user account settings.

Further, control part 10 may include RAM, ROM, flash memory, or the like. Also, control part 10 reads the control program stored in memory part 19, expands and executes the control program, and operates as each part of the functional block as described later.

In addition, control part 10 and memory part 19 may be combined into one large FPGA (Field Programmable Gate Array) circuit where the present embodiment is translated into gates, that is a configuration instead of machine code running on CPU. The circuit may also be configured as a large ASIC (Application Specific Integrated Circuit) chip. Also, it can be configured with a combination of FPGA and ASIC chips. The circuit may even add other parts, such as a sheet-like computer with printing semi-conductor computer, a glass-substrate printing computer, or the like.

(Configuration of Image Forming Apparatus 2)

Figure 3:
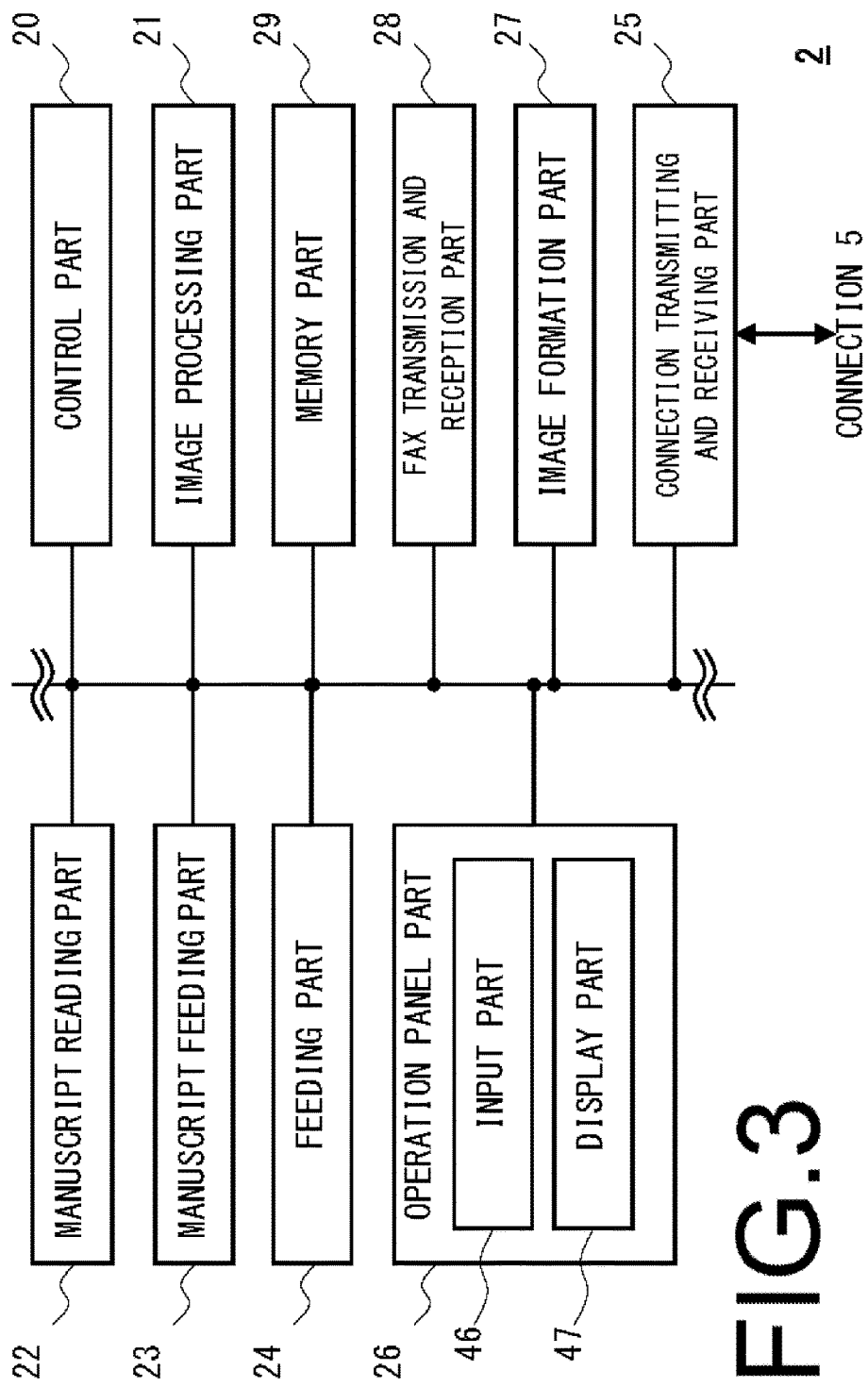
FIG. 3 is a block diagram showing a configuration of the image forming apparatus as shown in FIG. 1.

As refer to FIG. 3, image forming apparatus 2 includes image processing part 21, manuscript reading part 22, manuscript feeding part 23, feeding part 24, connection transmitting and receiving part 25, operation panel part 26, image formation part 27, FAX transmission and reception part 28, and memory part 29, or the like. Each part is connected with control part 20 and is operation-controlled by control part 20.

Control part 20 is an information processing part, such as CPU, or the like. Control part 20 reads the control program stored in memory part 29, executes the control program, and is operated as each part of the functional block as described later. Also, control part 20 controls a whole device corresponding to specified instructions information inputted in terminal 1 or operation panel part 26. In addition, control part 20 may be completely circuit-based or be configured as a circuit on FPGA and/or ASIC chip as like control part 10 in FIG. 2.

Image processing part 21 is an information processing part for image processing. Image processing part 21 performs specified image processing for image data. For example, image processing part 21 performs various image processing, such as scaling, density control, gradation adjustment, image improvement, or the like. Image processing part 21 stores an image read by manuscript reading part 22 to memory part 29, temporarily, as print data or object 400 (FIG. 4) as described later.

Manuscript reading part 22 reads a set manuscript. Also, manuscript reading part 22 is arranged on the upper part of the body part in image forming apparatus 2. Manuscript reading part 22 is provided with a scanner, platen glass, and a manuscript reading slit. Manuscript reading part 22, when reading the manuscript placed on the platen glass, moves the scanner to the position that faces the platen glass, reads with scanning the manuscript placed on platen glass, and acquires image data. The acquired image data is stored in memory part 29.

Also, manuscript reading part 22, when reading the manuscript fed from manuscript feeding part 23, moves the scanner to the position that faces a manuscript reading slit. Then, manuscript reading part 22 reads the manuscript through the manuscript reading slit as synchronizing with the conveying action of the manuscript by manuscript feeding part 23 and acquires image data. Manuscript reading part 22 stores the acquired image data in memory part 29.

Manuscript feeding part 23 conveys the manuscript read by manuscript reading part 22. Manuscript feeding part 23 is arranged on the upper part of manuscript reading part 22. Manuscript feeding part 23 is provided with a manuscript mounting part and a manuscript transport mechanism. Manuscript feeding part 23 feeds out the manuscript placed on the manuscript mounting part one sheet at a time in order by the manuscript transport mechanism and feeds to manuscript reading part 22.

Feeding part 24 feeds out a recording paper one sheet at a time directing to image formation part 27. Feeding part 24 is provided in a body part.

Connection transmitting and receiving part 25 is a connecting part for connecting with connection 5. Connection transmitting and receiving part 25 transmits and receives data via network, wired or wireless connection. Also, connection transmitting and receiving part 25 may transmit and receive an audio signal via a voice call line. This voice call line may be a wired or wireless cell phone line.

Operation panel part 26 is provided with input part 46 and display part 47. Also, operation panel part 26 is arranged on front-side in image forming apparatus 2. Input part 46 is provided with a button, a touch panel, or the like. The buttons are a numeric keypad, start, cancel, switching of operational mode, and a button to instruct for executing a job, or the like. Input part 46 acquires instructions for the various jobs in image forming apparatus 2 by a user. Also, by user instructions acquired from input part 46, it is also possible to input and change each user's information.

Image formation part 27 performs image formation for data, which is stored in memory part 29, is read by manuscript reading part 22, or is acquired from terminal 1 by the user's output instruction to a recording paper. Image formation part 27 is provided with a photo conductor drum, an exposure part, a developing part, a transfer part, a fixing part, or the like. Image formation part 27 records a toner image on a recording paper by performing the image formation process, which includes electrification, exposure, development, transfer, and fixing.

FAX transmission and reception part 28 transmits and receives a facsimile. FAX transmission and reception part 28 possibly performs facsimile reception from other FAX equipment via a sound line, stores in memory part 29, and performs image formation by image formation part 27. Also, FAX transmission and reception part 28 possibly convert the image of manuscript read by manuscript reading part 22 or data of network FAX transmitted from terminal 1 to image data and performs facsimile transmission via the sound line to another FAX equipment.

Memory part 29 is a non-transitory recording medium. The control program for operation-controlling image forming apparatus 2 is stored in memory part 29. In addition, memory part 29 may also store user account settings. Also, an area of the storage folder for each user may be included in memory part 29.

In addition, in image forming apparatus 2, control part 20 and image processing part 21 may be integrally formed. Also, control part 20 and image processing part 21 may include a non-transitory recording medium. Also, some other configuration parts may be combined as one unit.

[Control Configuration of Image Forming System X]

Here, as refer to FIG. 4, a control configuration in image forming system X is explained. Control part 10 in terminal 1 includes form making part 100 and layer setting part 110. Memory part 19 in terminal 1 stores form data 300 and variable data 310. Control part 20 in image forming apparatus 2 includes VDP executing part 200. Memory part 29 in image forming apparatus 2 stores form data 300 and variable data 310.

Form making part 100 generates form data 300 for variable data printing in which a plurality of objects 400 are arranged. In this case, form making part 100 may set attribute of arranged object 400 and correspondence to variable data 310 by using GUI. Also, form making part 100 can acquire image data of a manuscript, which is read by manuscript reading part 22 in image forming apparatus 2, as object 400. Also, form making part 100 may set object 400, which may be the acquired image data, to a reference that may not be actually-outputted to image forming apparatus 2.

Layer setting part 110 sets a layer for object 400 in form data 300, which is made by form making part 100. In this case, layer setting part 110 can set front object 400, which object 400 for a reference exist behind (rear,) as a semi-transparent layer. That is, about a target object 400 with a high priority of rendering, if there is the other object 400 overlapped with the target object, and the other object 400 has been set as a reference, layer setting part 110 sets the target object 400 with the high priority as a semi-transparent layer. Also, layer setting part 110 can set up the opacity of object 400 set as the semi-transparent layer.

In the present embodiment, display part 17 superimposes the semi-transparent layer set up by layer setting part 110 and other layers. In this case, also about object 400 set as the semi-transparent layer and other objects 400 set a priority, such as Z value, or the like, may be superimposed. Also, display part 17 possibly superimposes form data 300 and corresponding variable data 310.

VDP executing part 200 executes variable data printing. In detail, VDP executing part 200 makes image formation perform to image formation part 27 by using form data 300 generated in terminal 1 with variable data 310. In this case, VDP executing part is possible to make form data 300 print on paper(s) in which variable data 310 has already been printed.

Form data 300 are printing data for variable data printing in which objects 400 is arranged. Form data 300 may be data based on PPML (Personalized Print Markup Language,) for example. Also, for example, form data 300 may include various kinds of objects 400, such as, a corporate logo, a printing column for each data of variable data 310, or the like. For example, objects 400 may be data of PPML, PDL (Page Description Language,) XML (eXtensible Markup Language,) image data, or the like. That is, in form data 300, the image data of the manuscript read by manuscript reading part 22 may be included as object 400. In this case, the manuscript may be a paper, such as an envelope, a slip, or the like, which are to be performed variable data printing. Also, in this paper, variable data 310 for a reference may have already been printed. Also, various kinds of attribute data may be attached to each object 400. Also, various kinds of attribute data may be attached to a group of collected objects 400. For example, as the attribute data of each object 400 and the group of objects 400, a setting of a layer, which is a priority at the time of rendering (Z value,) may be included. Also, for each object 400, rendering permeability (opacity) as attribute data for preview displaying may be set up. The object 400 or the layer set the opacity may be displayed with mixing the color of overlapped object 400 for the reference with set rate of the opacity. Also, attribute data may include, for example, settings of object 400 about: a type, a position (coordinates,) a color, and correspondence with variable data 310, or the like. Also, attribute data whether or not object 400 is actually outputted to image forming apparatus 2, that is, settings whether or not for a reference, may be included.

Variable data 310 is variable data for variable data printing. Thus, variable data 310 is used as a data source of form data 300. For example, variable data 310 may be a database file, such as a ".csv" file, a tab-separated file, or the like. Each data in variable data 310 may have correspondence to each display column of form data 300. Also, variable data 310 may be image data read by manuscript reading part 22. Also, variable data 310 may be a list of file names, each which point to an image file stored in memory part 19, memory part 29, NAS, so-called "cloud" server address, or the like. In this case, the same file name can be used for a field of a form and can be distinguished with the name of the field, tab index, SQL field index, or the like, (hereinafter, it is simply called as "index"), which is indicated with an attribution (mark) in form data 300.

Also, variable data 310 may include additional finishing details, which are an amount of gloss film, amount and color of glitter to add, or extra physical object(s), or the like. These may be used, such as in some birthday cards, or the like, and these may be added/glued to a given location on a recording paper.

In addition, it may also be a configuration that variable data 310 is included in form data 300 as object 400.

Here, control part 10 of terminal 1 executes the control program stored in memory part 19 and is functioned as form making part 100 and layer setting part 110. Control part 20 of image forming apparatus 2 executes the control program stored in memory part 29 and is functioned as VDP executing part 200. The also, each part of above-mentioned terminal 1 and image forming apparatus 2 serve as hardware resources that execute the image forming method in the present disclosure. In addition, the above-mentioned part or an arbitrary combination of functional parts may be configured with an IC, a programmable logic as like FPGA or ASIC, or the like, in hardware.

[Variable Print Data Making and Setting Process by Image Forming System X]

Then, as refer to FIG. 5-FIG. 12, the variable print data making and setting process by image forming system X according to the embodiment in the present disclosure is explained.

In the VDP printing process in the present embodiment, it automates the process of "pinning" a printable page (hereinafter, it is called as a "reference image"). That means, pinned reference image cannot be edited, moved, resized, nor changed in the layer or level of the parts or objects on a page.

Moreover, the reference image is set such that it will change the opacity of other objects so that the reference image will always remain visible to a user. Further, the reference image will not be visible during the preview mode as well as not being included in the final output from the application. This is especially useful when building a form around printable page of the variable data portion where data will always be in the same physical location of the paper, and other objects of the form will be generated around this at fixed location.

If the printable page is an image, such as a scanned image after printing and importing, or the like, the user may be repositioning it before it can be used as a reference image.

Also, if the printable page is a PDF (Portable Document Format) data, it can be importing and rendering the PDF page as a reference image.

Also, if the printable page is a data written in PDL (Page Description Language,) such as HP® PCL, Adobe® PostScript, or Kyocera® Prescribe, or the like, it can be rendering (rasterizing) the PDL data as a reference image.

The advantage of PDF or PDL rendering is that the imported image does not have to be re-positioned to match when outputting by image forming apparatus 2.

In process summary, for producing a print job consisting of variable data portion that changes across one or more pages and non-variable data portion which is fixed throughout the job and where in the process of creating this job, one or more parts of the job is considered to be a reference image. This is because the rest of the job are to be built around this reference image.

In detail, the variable print data making and setting process in the present embodiment, form data 300 for variable data printing in which a plurality of objects 400 are arranged are made. In this case, a target object 400 that overlaps the other object 400 for a reference behind (rear) is set as a semi-transparent layer. Also, preview displaying of superimposing object 400 set as the semi-transparent layer and the layer of other objects 400 is performed. In addition, it may perform variable data printing by using form data 300 and variable data 310. In the variable print data making and setting process in the present embodiment, control part 10 in terminal 1 mainly-executes the program stored in memory part 19 by using hardware resources as collaborating with each part.

In the following, with reference to a flow charts in FIG. 5 to FIG. 8, the details of the variable print data making and setting process are explained for each step.

<Reference Image Setting Process>

As refer to FIG. 5, reference image setting process is explained. The flow chart shows how a user sets a reference image by using terminal 1. Also, this is a flow chart of the steps the control part 10 of terminal 10 will take to set the reference image of a given object to form data 300 by instructions inputted by the user.

Firstly, form making part 100 starts a form making process. In terminal 1, a user makes the device driver of image forming apparatus 2 or a PPML making application for variable print data start. Then, form making part 100 starts making of the form data 300 by instructions of the user.

Figure 9:
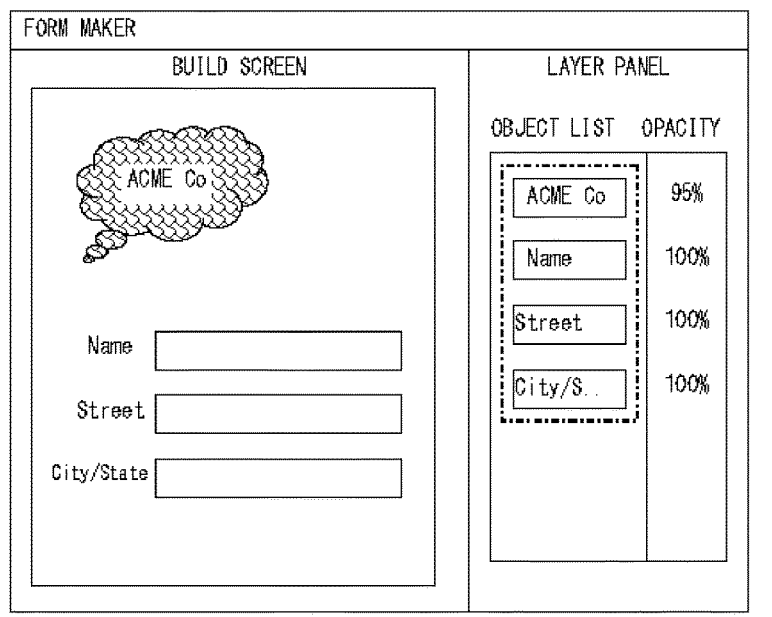
FIG. 9 shows the example screen according to the embodiment in the present disclosure.

As refer to FIG. 9, example screen 500 for GUI is shown. Various objects 400 are placed on the screen. In this example, there is one image with company name, and three text fields for Name, Street and City/State, along with the relative order of each objects in the layer panel along with current opacity setting (0% is transparent and every object below can be seen while 100% is non-transparent and no object can be seen below that object). For example, form making part 100 of control part 10 arranges these objects 400 on the screen. In example screen 500, object 400 showing "ACME Co" shows a corporate logo and objects 400 of form showing a "name", a "street", and a "city/state" are arranged.

Step S501: After starting, control part 10 imports a reference page to become a reference image. This can be a scanned in image, PDF or PDL that gets imported and rendered on display part 17 with GUI. In the following, the process executed by the control part 10 is by using instruction of the user with GUI. The control part 10 reflects them in form data 300 in storage part 19.

Step S502: Then, control part 10 enables and sets position of reference lines. The reference lines are lines that are used to line up against a ruler on X axis as well as another ruler on Y axis.

Step S503: Then, control part 10 sets a reference page. In this step, the reference lines are also used to position the image so that they can be placed on the page at exact location.

Step S504: Then, control part 10 disables or removes the reference lines.

In addition, control part 10 may not execute Steps S502 to S504 for importing PDF or PDL since these contain the exact position data required to be printed, and GUI display can reflect the position data.

Step S505: control part 10 finally marks the imported object as the reference image to form data 300 in memory part 19. After that, reference image generating and adding process illustrated in FIG. 6 can be performed. The above processes can be done via menu selection, a button selection, command name input, key stroke as like a control key plus a character combination, or via a special area defined in the Layer Panel. In the example screen 503 in FIG. 12, it exemplifies the reference area. Thus, the current object can be dragged and dropped into the reference area, or dragged and dropped out of the non-reference area will automatically create a new reference image.

In addition, Steps S502 to S505 may be eliminated if the import part of Step S501 can import a PDF or PDL as a reference image. In this case, the image can be imported and then positioned based on the position data contained in PDF or PDL so that the display will show exact placement of the image as if it was printed on the paper.

<Reference Image Generating and Adding Process>

Figure 6A:
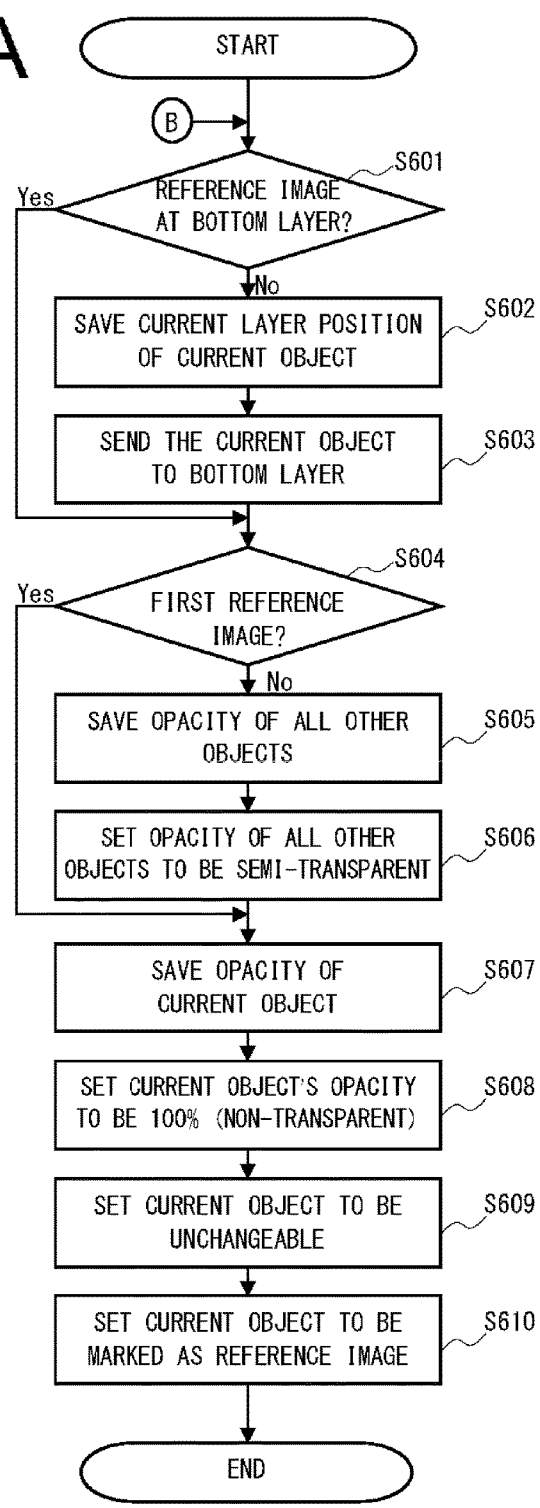
FIG. 6A is a flow chart of reference image generating and adding process according to the embodiment in the present disclosure.

Then, as refer to FIG. 6A, reference image generating and adding process is explained. In this process, control part 10 also processes to have the setting reference image in form data 300 in memory part 19. In FIG. 6A, the flow chart shows how control part 10 processes the reference image setting after Step S504 in FIG. 5 is completed.

After Step S505 in FIG. 5 and before starting Step S601 in FIG. 6A and shown below, the GUI may look like example screen 501 in FIG. 10. Since an imported reference page is the last object brought into the tool, it is at the top of the layers, and since opacity is at 100%, none of the other objects is currently visible.

In addition, the opacity of each object 400 is set up to "100%," which is non-transparent. On the other hand, as if completely-transparent, that means the case of not displaying, opacity will be set to "0%." Also, about each object 400, it is also possible to set up correspondence to form data 300.

Step S601: Control part 10 checks if the current object is at the bottom of the layer or the only object on the current page.

If Yes, control part 10 advances the process to Step S604. In this case, bottom of the layer includes those other objects already marked as reference image. Thus, if all the previous object or objects has been marked as reference image(s), control part 10 can skip to process the current object as well.

If No, control part 10 advances to Step S602.

Step S602: Control part 10 saves the current layer position of the current object. This can be either absolute [layer #] or relative [above object A and below object B]. If absolute position is saved, then they have to be updated if new objects are added or deleted. This situation may occur by undo or redo operation as well. Also, with relative position, the relative relations have to be maintained whenever one or more objects related to the original position of the reference image are moved around or added or deleted.

Step S603: Control part 10 sends the current object to the bottom of the layers and update the GUI display and the Layer Panel, appropriately. In addition, the ordering of multiple reference images can be first in first out or first in last out. Also, mobility between the reference image layers can be allowed as long as they are among other reference image(s).

Figure 11:
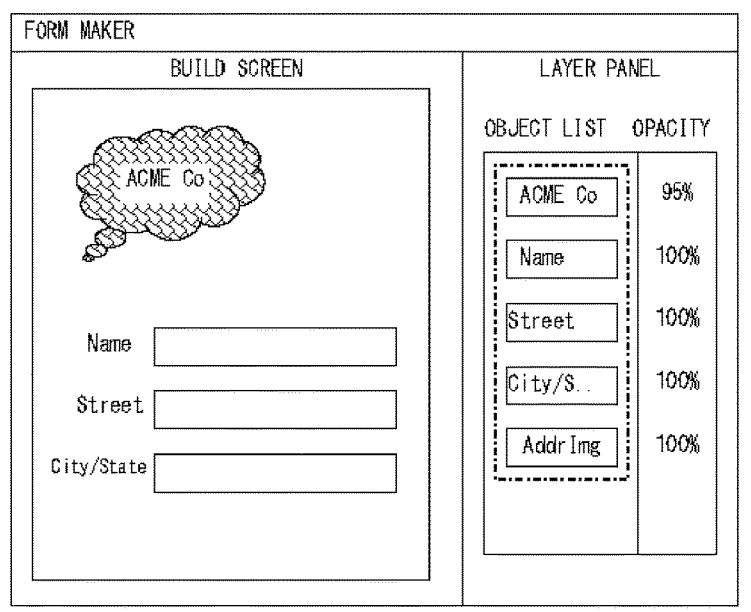
FIG. 11 shows the example screen according to the embodiment in the present disclosure.

As refer to FIG. 11, the example screen shows how the GUI might look after this Step S603 is completed. Since the opacity of other objects are at or near 100%, the current image is no longer visible in the GUI column labeled as "BUILD SCREEN," being obscured by the higher layer objects, but it can be seen in the Layer Panel.

Step S604: Control part 10 checks there is already at least one other reference image. That means control part 10 determines this is the first Reference Image or not.

If Yes, control part 10 skips to Step S607.
If No, control part 10 advances to Step S605.

Step S605: Control part 10 saves all non-current objects' opacity settings to form data 300.

Step S606: Control part 10 changes all non-current object's opacity to be semi-transparent, for example, at 30% to form data 300.

Step S607: Control part 10 saves the opacity of the current object. In addition, if this is not the first reference image, then control part 10 will already have semi-transparent opacity to the current object as explained in FIG. 6B. Thus, for the current object, the original opacity that has been set before the first reference image can be selected.

Step S608: Control part 10 sets the current object's opacity to be 100%, which is non-transparent. This will make it visible through all the non-reference objects. Other appropriate changes are the opacity settings of each reference image to highlight different layers of reference images. In addition, the range of opacity setting of reference images has to be higher than the range of non-reference objects so that the reference images will always be visible through all non-reference objects. Also, the gap between the ranges have to be noticeable, 30% for example, so that they are distinct, and the user can visually tell if an object is reference image or not. Another way to distinguish may be done by using different colors to outline the reference image vs non-reference objects.

Step S609: Control part 10 sets current object to be unchangeable. This means that the user cannot move it, resize, rotate, nor change the level of the layer. The only exception is layer change. That is, if there are more than one reference images, control part 10 may possibly to rearrange them since each reference image is at 100% opacity, and the order will make a difference on what is visible or not.

Step S610: Control part 10 marks the current object, internally, as reference image. Control part 10 may add visual elements to the GUI display area labeled as "BUILD SCREEN" in FIG. 13 to show that the object is now marked as reference image. This marking may be performed as like with a different color border surrounding it, or the like. Another option is to show on the layer panel as distinct list of objects, as can be seen in FIG. 13.

<New Object Adding Process>

As refer to FIG. 6B, new object process, which adds a new object to form data 300 after reference image is set, is explained.

Step S621: Firstly, control part 10 check if at least one reference image is set.

If Yes, control part 10 advances to Step S622.
If No, control part 10 skips to Step S624.

Step S622: Control part 10 saves the current object's opacity setting as 100% and add to a list of non-reference object in form data 300.

Step S623: Control part 10 sets the current object's opacity to be semi-transparent, such as 30%, or the like. In addition, this semi-transparent value may not be a fixed-percent, and it may be adjusted the number of object or reference image, or the like.

Step S624: Control part 10 places new object at the top of the layer and display on the GUI screen as well as adding appropriate image or text to the Layer Panel.

In addition, these steps are valid for Undo and Redo operations when an object is displayed on the screen. For example, this can be performed undo after deleting a non-reference object. Also, when deleting an object, there is no special steps required since the opacity does not have to be updated for an object no longer on the screen whether this is by using the delete command, cut command, or undo after generating it.

<Object Moving Process>

Then, as refer to FIG. 6C, object moving process when moving an object in the Layer Panel is explained. In this process, objects can be moved around in the Layer Panel, when there is at least one reference image and is in "BUILD SCREEN," where reference image is displayed, as shown as an example in FIG. 13. In the following, area displayed reference image in a screen section, such as "BUILD SCREEN" is called as the "reference area," and outside of the reference area in the same screen section is "non-reference area."

Step S631: Control part 10 checks if the current object is a reference image.

If Yes, control part 10 advances to Step S632.
If No, control part 10 skips to Step S636.

Step S632: Control part 10 checks if there is more than one (two or more) reference image in the reference area.

If Yes, control part 10 advances to Step S633.

If No, control part 10 advances to Step S634.

Step S633: If there is more than one reference image, control part 10 allows user to move around within the reference images or even outside to the non-reference area. Then, control part 10 advances to Step S635.

Step S634: If there is only one reference image, control part 10 can only move the current object, which is reference image, out to the non-reference area by instructions of the user. Then, control part 10 advances to Step S635.

Step S635: After releasing the object being dragged, control part 10 checks if the object still in the reference area.

If Yes, control part 10 ends this process. Accordingly, the display section, such as "BUILD SCREEN," will be updated.

If No, control part 10 advances PART A, which is Step S701 in FIG. 6D.

Step S636: Since the current object is not the reference object, control part 10 allows it drag to be within non-reference area or even into the reference area.

Step S637: Then, control part 10 checks the current object is in the reference area or not after releasing the current object.

If Yes, control part 10 advances PART B, which is Step S601 in FIG. 6A.

If No, control part 10 ends the process. Accordingly, the display section, such as "BUILD SCREEN" will be updated.

<Removing Reference Image Setting Process>

Then, as refer to FIG. 6D, removing reference image setting process, which is a process to unset the reference image settings, is explained. This process is a process to undo the reference image generating and adding process in FIG. 6A, and the reference image becomes non-reference, again.

Step S701: Control part 10 checks if there is at least one reference image.

If Yes, control part 10 advances to Step S702.

If No, control part 10 ends this process.

Step S702: Control part 10 sets selected reference image, which is the current object, to be changeable.

Step S703: Control part 10 restores the former opacity of the reference image, which is the current object.

Step S704: Control part 10 restores the former layer's position.

Step S705: Control part 10 removes reference image status. That means, the setting of the current object is set as non-reference in form data 300.

Step S706: Control part 10 checks if more than one reference image remains or not.

If Yes, control part 10 ends this process.

If No, control part 10 advances to Step S707.

Step S707: Since no more reference image is left, control part 10 restores the opacity of all other objects in form data 300. Thus, the screen will be updated with the restored opacity.

<Job Rending Process>

Then, as refer to FIG. 7, job rending process, which is a process to render a selected job (all the pages) with reference image(s) and all records of variable data 310, is explained. FIG. 7 shows how the whole job is processed for all the VDP records and pages to preview on display part 17 in terminal 1 or display part 47 in image forming apparatus 2. In the embodiment, the form data 300 is collected as a job data, which may be set in a "project" data executed by control part 10 and may be a variable document file itself.

Step S801: Control part 10 gets the first or next index of variable data 310 with form data 300 of the job.

Step S802: Control part 10 resets the pages to start from the first page of the job.

Step S803: Control part 10 gets the first or next page of the job.

Step S804: Control part 10 executes page rendering process. The details of this page rendering process are described later.

Step S805: Control part 10 checks to finish processing the last page.

If Yes, control part 10 advances to Step S806.

If No, control part 10 goes back to Step S903 for processing the next page.

Step S806: Control part 10 checks to finish processing all the indices of variable data 310.

If Yes, control part 10 end the process.

If No, control part 10 goes back to Step S801 to process the next index of variable data 310

In addition, similar process is executed by VDP executing part 200 of control part 20 in image forming apparatus 2, and printing the selected job via image formation part 17 or faxing via fax transmission and reception part 28 can be performed.

<Page Rendering Process>

Then, as refer to FIG. 8, page rendering process where processing one page with reference image(s) and variable data 310 is explained. In detail, one set or index of variable data 310 is selected and rendered. This can be a preview of one record on one page or a printing or faxing one page.

Step S841: Control part 10 gets first or next object on the page. Control part 10 may start from the bottom of the layer.

Step S842: Control part 10 checks the current object is marked as a reference image or not.

If Yes, control part 10 skips to Step S849.

If No, control part 10 advances to Step S843.

Step S843: Control part 10 checks the current object is marked as variable data or not.

If Yes, control part 10 advances to Step S844.

If not, control part 10 skip to Step S846.

Step S844: Control part 10 extracts the appropriate variable data from the variable data 310 for the selected index.

Step S845: Control part 10 adjusts to format the data for text, image, or other settings as set in this current object. In addition, the format can be set in form data 300 for each object marked as the variable data.

Step S846: Control part 10 checks there is any reference image on the current page.

If Yes, control part 10 advances to Step S847.

If No, control part 10 skips to Step S848.

Step S847: Control part 10 restores the original opacity of the current object because it has been forced to be semi-transparent at Step S606.

Step S848: Control part 10 renders the current object and display on display part 17. In addition, control part 10 or control part 20 may fax, print, or output to file as like PDF.

In this process, if it is text, control part 10 formats according to the settings as like font family, font size, font attribute (Bold, Underline, Italic, or the like,) font color, shadow effects, background color, rotation, text alignment horizontally (right, left, centered, or justified,) and vertically (top, middle, bottom,) or the like.

If it is image, control part 10 formats based color vs grayscale vs black-and-white setting, scaling, rotation, skew, or the like.

If it is a finisher setting on a printer as like adding a glossy layer for a given area, control part 10 or control part 20 will be applied after the printing is done and communicated to an in-line finisher for a connected finisher, or to an operator for off-line finishers to be need finishing.

Step S809: Control part 10 checks the current object is the last object on the page.

If Yes, control part 10 ends the process.

If No, control part 10 go back to Step S841 to work on the next object.

In addition, as described above, VDP executing part 200 in image forming apparatus 2 may execute variable data printing with a job with form data 300 transmitted from terminal 1 by an instruction inputted by input part 46 in operation panel part 26 or an instruction from terminal 1.

In this case, VDP executing part 200 may output the recording papers where variable data 310 has already been printed or may simultaneously-output form data 300 and variable data 310. Also in this output, VDP executing part 200 may make record on a recording paper by image formation part 27, may make perform facsimile transmission by FAX transmission and reception part 28, may store as electronic-filing-document data in the document box, or the like. Also, in this case, VDP executing part 200 may perform preview displaying for variable data printing on display part 47.

As above-mentioned, the variable print data making and setting process according to the embodiment in the present disclosure is completed.

<Example GUI of a Variable Data Form Maker>

As refer to FIG. 9 to FIG. 12, it summarizes how GUI might look like as the steps are processed.

FIG. 9 is at the state before Step S501.

Figure 10:
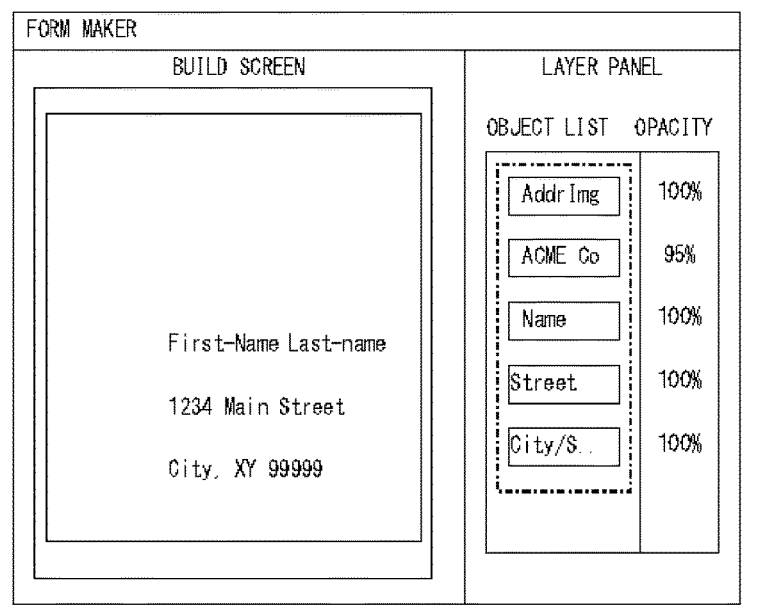
FIG. 10 shows the example screen according to the embodiment in the present disclosure.

FIG. 10 is at the state after Step S504.

FIG. 11 is at the state after Step S603.

Figure 12:
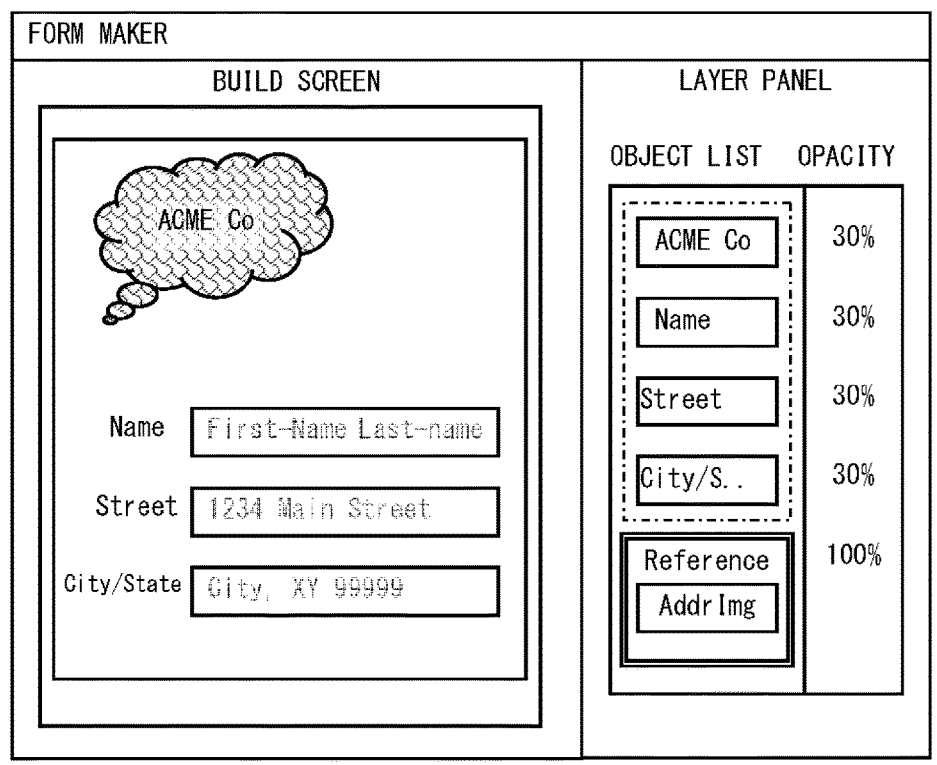
FIG. 12 shows the example screen according to the embodiment in the present disclosure.

FIG. 12 is at the state after Step S610.

The following effects can be obtained with a configuration as mentioned above.

In a typical technology for variable data printing, variable data and form has outputted, independently. In this case, variable data is printed beforehand, and form is made after that.

Therefore, the difference in printing is happened. That means, form is actually-printed on the paper in which variable data has been printed, and the user need to confirm and correct by visual inspection. Therefore, making of form data consumes time and effort.

On the other hand, image forming system X according to the embodiment in the present disclosure is an image forming system including terminal 1 and image forming apparatus 2. Terminal 1 is provided with form making part 100 that generates form data 300 for variable data printing in which a plurality of objects 400 is arranged. Also, terminal 1 is provided with layer setting part 110 that sets a target object 400 generated by form making part 100 overlapping another object 400 for a reference behind as a semi-transparent layer. Also, terminal 1 is provided with display part 17 that superimposes object 400 set as the semi-transparent layer by layer setting part 110 and the layer of other objects 400. Also, image forming apparatus 2 is provided with image formation part 27 that performs variable data printing with form data 300 generated in terminal 1 and variable data 310.

With a configuration in this way, while confirming object 400 for a reference, form data 300 can be made, easily.

Also, in a typical technology, when creating a job with variable data information as like mail merge application for variable data printing (VDP,) it is nearly impossible to use an existing printable page to build a form around it. Printable page can be a ready to print page like an image or PDF file or PDL file.

To do so with a typical application, one has to bring the printable page with repositioning as necessary, and then as the form parts or objects are added (rectangles, other shapes, pictures, static text), each part has to be set to semi-opaque so that the original printable page can be seen through the parts.

When the job is ready to print, then the printable page has to be removed and then all the objects' opacity have to be restored to the original intent values.

One also has to pin the printable page in a fixed location so that it cannot be moved or resized, accidentally.

Also the printable page has to be placed as the first part so as to be at the bottom of the layers of remainder of the form objects. However, this does not guarantee that it will not be moved around the layers, which can hide parts of the form and until the whole page is printed, may not notice any problem with those objects which are hidden. Thus, printable page has to be brought back in with repositioning as necessary and then go through the opacity settings.

On the other hand, by using the image forming system X in the present disclosure, form data 300 can be used without the above-mentioned troublesome manual procedures.

Also, in image forming system X according to the embodiment in the present disclosure, layer setting part 110 of terminal 1 sets up the opacity of object 400 set as the semi-transparent layer, individually.

As configured in this way, if improving the visibility of some objects 400, a user can adjust each of them, distinctly, and the usability for making of form data 300 becomes better.

Also, in image forming system X according to the embodiment in the present disclosure, image forming apparatus 2 is further provided with manuscript reading part 22 that reads a manuscript and generates image data. Also, object 400 for the reference in form data 300 is the image data read by manuscript reading part 22.

As configured in this way, form data 300 can be made with referring to a paper where printing is actually-presented, such as a slip, an envelope, or the like. Therefore, usability for the user can be improved.

Other Embodiments

In addition, in the embodiment of the present disclosure, it is shown that the priority of rendering of object 400 for a reference is set as rear face, and other overlapping objects 400 are set as a semi-transparent layer. However, it may have a configuration that the priority of rendering of object 400 for the reference is kept as front and is set up semi-transparent, and it renders a layer of other objects 400 to rear face. In this case, since object 400 for the reference is set not to be selected in a preview screen, it can be possible to operate object 400 rendered behind. Similarly, a configuration that object 400 for the reference and other objects 400 can be selected as semi-transparent, automatically, by using the priority of rendering between them is possible.

With a configuration in this way, form data 300 can be made flexibly while referring to object 400 for the reference.

Also, variable data 310 may be made in terminal 1, may be applied to made form data 300, and then may be performed a preview displaying. In this case, semi-transparent superimposing is also possible for variable data 310 with object 400 for the reference.

As configured in this way, it becomes possible to perform a comparative examination of object 400 for the reference and an output of actual variable data printing, easily.

Also, in the above embodiment, as embodied and broadly described, the present disclosure provides a method implemented on a computer system, which is connected to a printer or image forming apparatus via the network (or other physical or wireless connection). However, the present disclosure is applicable to information processing apparatus other than an image forming apparatus. That is, it may be a configuration by using the network scanner, the scanner separately connected with a server by using USB, or the like.

Also, the configuration and operation of the above-mentioned embodiment are an example, and it cannot be overemphasized that it can change suitably and can perform in the range that is not deviate from the aim of the present disclosure.

The invention claimed is:

1. An image forming system having a terminal and an image forming apparatus, wherein:
    the terminal includes
    a form making part that generates form data for variable data printing in which a plurality of objects is arranged, wherein the plurality of objects comprises a first object and a reference object that are overlapping objects;
    a layer setting part that
        sets the first object as a semi-transparent layer;
        moves the reference object to a bottom layer; and
        pins the reference object such that it cannot be edited, moved, resized, or changed in layer;
    a display part that superimposes the first object set as the semi-transparent layer by the layer setting part and a layer of other objects; and
    a control part that provides an output based on the form data, wherein the output does not comprise the reference object; and
    the image forming apparatus includes
    an image formation part that performs variable data printing of the output.

2. The image forming system according to claim 1, wherein
    the layer setting part in the terminal is configured to allow a user to set up opacity of the first object set as the semi-transparent layer and opacity of the other objects individually to different levels of opacity.

3. The image forming system according to claim 1, wherein
    the image forming apparatus further comprises a manuscript reading part that reads a manuscript and generates image data; and
    the reference object is the image data read by the manuscript reading part.

4. The image forming system according to claim 2, wherein
    the image forming apparatus further comprises a manuscript reading part that reads a manuscript and generates image data; and
    the reference object is the image data read by the manuscript reading part.

5. A terminal comprising:
    a form making part that generates form data for variable data printing in which a plurality of objects is arranged, wherein the plurality of objects comprises a first object and a reference object that are overlapping objects;
    a layer setting part that
        sets the first object as a semi-transparent layer;
        moves the reference object to a bottom layer;
        sets the reference object as a non-printed object; and
        pins the reference object such that it cannot be edited, moved, resized, or changed in layer;
    a display part that superimposes the object set as the semi-transparent layer by the layer setting part and a layer of other objects; and
    a control part that provides an output based on the form data, wherein the output does not comprise the reference object.

6. The terminal according to claim 5, wherein
    the layer setting part in the terminal is configured to allow a user to set up opacity of the first object set as the semi-transparent layer and opacity of the other objects individually to different levels of opacity.

7. The terminal according to claim 5, wherein
    the reference object is an image data read by a manuscript reading part.

8. The terminal according to claim 6, wherein
    the reference object is an image data read by a manuscript reading part.

9. An image forming method executed by an image forming system including a terminal and an image forming apparatus, comprising the steps of:
    generating form data for variable data printing in which a plurality of objects is arranged, wherein the plurality of objects comprises a first object and a reference object that are overlapping objects;
    setting the first object as a semi-transparent layer;
    moving the reference object to a bottom layer;
    pinning the reference object such that it cannot be edited, moved, resized, or changed in layer;
    setting the reference object as a non-printed object;
    superimposing the first object set as the semi-transparent layer and a layer of other objects; and
    performing variable data printing with the form data.

10. The image forming method according to claim 9, further comprising a step of allowing a user to individually set up opacity of the first object set as the semi-transparent layer and opacity of the other objects to different levels of opacity.

11. The image forming method according to claim 9, further comprising a step that reads a manuscript and generates image data; wherein
    the reference object is a read image data.

12. The image forming method according to claim 10, further comprising a step that reads a manuscript and generates image data; wherein
    the reference object is a read image data.

13. The image forming system according to claim 1, wherein the terminal is configured to
    determine whether the reference object is a bottom layer and set the reference object as the bottom layer upon determining that the reference object is not the bottom layer;
    determine whether the plurality of objects includes another reference object and set the opacity of each of the plurality objects, other than the reference object, to semi-transparent upon determining that the plurality of objects includes the another reference object; and
    set the reference object to non-transparent.

14. The terminal according to claim 5, wherein the terminal is configured to
    determine whether the reference object is a bottom layer and set the reference object as the bottom layer upon determining that the reference object is not the bottom layer;
    determine whether the plurality of objects includes another reference object and set the opacity of each of the plurality objects, other than the reference object, to semi-transparent upon determining that the plurality of objects includes the another reference object; and set the reference object to non-transparent.

15. The image forming method according to claim 9, further comprising:

determining whether the reference object is a bottom layer and setting the reference object as the bottom layer upon determining that the reference object is not the bottom layer;

determining whether the plurality of objects includes another reference object and setting the opacity of each of the plurality objects, other than the reference object, to semi-transparent upon determining that the plurality of objects includes the another reference object; and setting the reference object to non-transparent.

16. The image forming system according to claim 1, wherein the terminal is configured with an option to remove the reference setting of the reference object by determining the plurality of objects includes the reference object;

setting the reference object to be a changeable object;

restoring opacity of the reference object to a previous opacity setting;

restoring layer position of the reference object to a previous layer position; and removing the reference setting of the reference object.

17. The terminal according to claim 5, wherein the terminal is configured with an option to remove the reference setting of the reference object by determining the plurality of objects includes the reference object;

setting the reference object to be a changeable object;

restoring opacity of the reference object to a previous opacity setting;

restoring layer position of the reference object to a previous layer position; and removing the reference setting of the reference object.

18. The image forming method according to claim 9, further comprising steps of:

determining the plurality of objects includes the reference object;

setting the reference object to be a changeable object;

restoring opacity of the reference object to a previous opacity setting;

restoring layer position of the reference object to a previous layer position; and removing the reference setting of the reference object.

19. The image forming system according to claim 1, wherein the terminal is configured to, before said output, restore the opacity of the first object to a previous setting such that said semi-transparency is not reflected in the output.

20. The terminal according to claim 5, wherein the terminal is configured to, before said output, restore the opacity of the first object to a previous setting such that said semi-transparency is not reflected in the output.

* * * * *